United States Patent
Shamir et al.

(10) Patent No.: US 6,269,076 B1
(45) Date of Patent: Jul. 31, 2001

(54) METHOD OF RESOLVING SPLIT VIRTUAL LANS UTILIZING A NETWORK MANAGEMENT SYSTEM

(75) Inventors: Yoram Shamir, Kiriat Ono; Sharon Barkai, Shoham; Sarit Shani, Tel Aviv, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,104

(22) Filed: May 28, 1998

(51) Int. Cl.[7] ............................ G01R 31/08; H04L 12/24; H04L 12/28

(52) U.S. Cl. ........................ 370/217; 370/216; 370/218; 370/219; 370/220; 370/221; 370/242; 370/248

(58) Field of Search .................................. 370/94.1, 60.1, 370/207, 255, 396, 85.2, 85.13, 404, 216, 217, 218, 219, 220, 221, 222, 223, 225, 242, 244, 245, 248, 250, 251; 709/218

(56) References Cited

U.S. PATENT DOCUMENTS

| 4,823,338 | 4/1989 | Chan et al. . | |
|---|---|---|---|
| 4,975,906 | 12/1990 | Takiyasu et al. . | |
| 5,214,646 | 5/1993 | Yacoby . | |
| 5,280,476 | 1/1994 | Kojima et al. . | |
| 5,280,481 | 1/1994 | Chang et al. . | |
| 5,315,582 | 5/1994 | Morizono et al. . | |
| 5,321,693 | 6/1994 | Perlman . | |
| 5,321,694 | 6/1994 | Chang et al. . | |
| 5,329,527 | 7/1994 | Ujihashi et al. . | |
| 5,329,619 | 7/1994 | Page et al. ............................ | 395/200 |
| 5,345,558 | 9/1994 | Opher et al. .......................... | 395/200 |
| 5,365,523 | * 11/1994 | Derby et al. ......................... | 370/85.2 |

(List continued on next page.)

FOREIGN PATENT DOCUMENTS

| WO97/04386 | 2/1997 | (WO) | ............................. G06F/9/455 |
| WO98/02821 | 1/1998 | (WO) | ............................. G06F/13/00 |

OTHER PUBLICATIONS

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

(List continued on next page.)

*Primary Examiner*—Hassan Kizou
*Assistant Examiner*—Joe Logsdon
(74) *Attorney, Agent, or Firm*—Howard Zaretsky; McDonnell Boehnen Hulbert & Berghoff (57) ABSTRACT

A method for creating and resolving split VLANs in ATM networks. The method utilizes a Network Management System (NMS) and a standard management protocol such as SNMP. The method monitors the network by continuously polling all the devices in the network. Status related information collected by the NMS is used to construct a physical and logical topology of the network. In response to the detection of one or more physical splits in the network, the NMS creates one or more corresponding logical splits in the network by splitting one or more VLANs. In the case of two split portions, the split VLAN can be created if a redundant LES and second LECS are located on the side of the split which does not include the primary LES. The second LECS is configured to use the address of the redundant LES in replying to requests to join an ELAN from the disconnected LECs. The repair of the physical split is detected by the NMS and, in response, the NMS modifies the databases of all the LECS in the ELAN so that the same primary LES address is returned to any LEC requesting to join an ELAN. LECs previously attached to the redundant LES are disconnected and subsequently attached to the primary LES.

11 Claims, 4 Drawing Sheets

U.S. PATENT DOCUMENTS

| | | |
|---|---|---|
| 5,390,184 | 2/1995 | Morris . |
| 5,394,402 | 2/1995 | Ross . |
| 5,408,469 | 4/1995 | Opher et al. . |
| 5,444,702 | 8/1995 | Burnett et al. . |
| 5,465,294 * | 11/1995 | Chapman, Jr. et al. ............. 379/207 |
| 5,483,536 | 1/1996 | Gunji et al. . |
| 5,519,704 | 5/1996 | Farinacci et al. . |
| 5,548,646 | 8/1996 | Aziz et al. .............................. 380/23 |
| 5,548,723 | 8/1996 | Pettus .............................. 395/200.01 |
| 5,550,816 | 8/1996 | Hardwick et al. . |
| 5,550,818 | 8/1996 | Brackett et al. . |
| 5,566,014 | 10/1996 | Glance ................................. 359/124 |
| 5,583,865 | 12/1996 | Esaki et al. ........................... 370/397 |
| 5,600,644 | 2/1997 | Chang et al. ......................... 370/404 |
| 5,633,869 | 5/1997 | Burnett et al. ....................... 370/396 |
| 5,659,542 | 8/1997 | Bell et al. ............................. 370/496 |
| 5,666,487 | 9/1997 | Goodman et al. ............. 395/200.76 |
| 5,805,578 * | 9/1998 | Stirpe et al. .......................... 370/255 |
| 5,825,772 * | 10/1998 | Dobbins et al. ..................... 370/396 |
| 6,081,836 * | 6/2000 | Karapetkov .......................... 709/218 |

OTHER PUBLICATIONS

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

William Stallings, Data & Computer Communications, Sixth Edition, 2000, pp. 702–704.*

* cited by examiner

METHOD OF RESOLVING SPLIT VIRTUAL LANS UTILIZING A NETWORK MANAGEMENT SYSTEM

FIELD OF THE INVENTION

The present invention relates generally to data communication networks and more particularly relates to a method of creating and resolving split VLANs utilizing a NMS.

BACKGROUND OF THE INVENTION

Currently, there is a growing trend to make Asynchronous Transfer Mode (ATM) networking technology the basis of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

Lan Emulation

Today, most data traffic in existing customer premises networks travels over legacy LANs. It is desirable to permit these legacy LANs and their embedded infrastructure to operate with new ATM networks currently being deployed. To enable an easier migration path to ATM, the ATM Forum has defined the LAN Emulation (LANE) specification which allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in legacy LANs. The emulated LAN provides communication of user data frames between its users just as in an actual legacy LAN.

Figure 1:
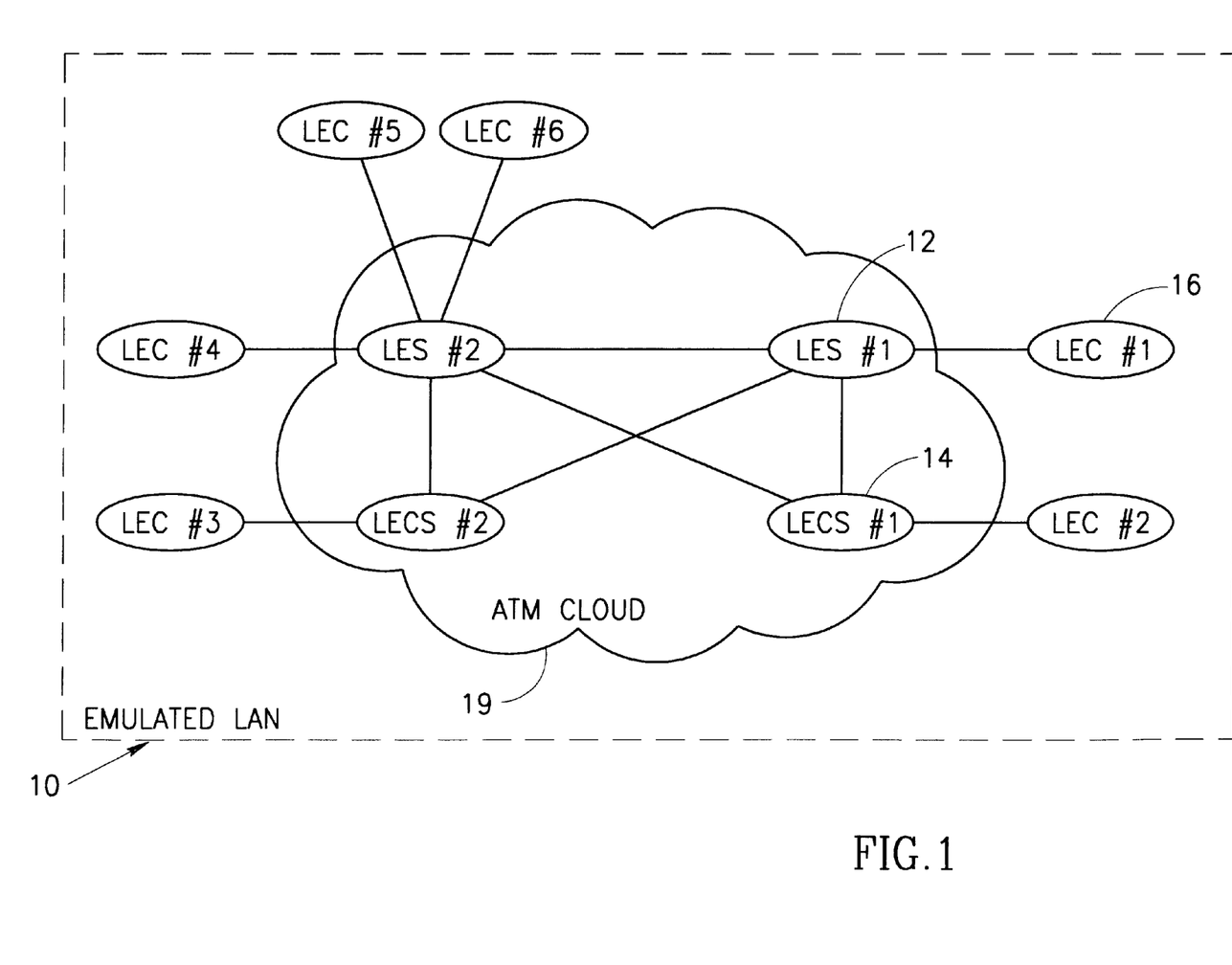
FIG. 1 is a diagram illustrating an example ATM network with an Emulated LAN having a plurality of nodes, LESs, LECSs and LECs.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A diagram illustrating an example ATM network having a plurality of nodes, LESs, LECSs and LECs is shown in FIG. 1. The network, generally referenced 10, comprises an ATM network cloud 19 which includes a plurality of nodes (switches) 12 connected by one or more links. A plurality of edge devices 16, which include LECs, labeled LEC #1 through LEC #6 are connected to the switches. A plurality of LESs labeled LES #1 and LES #2 are also connected to switches. In addition, a plurality of LECSs 14 labeled LECS #1 and LECS #2 are also connected to switches.

The entities defined by the LANE architecture include LAN Emulation Clients (LECs), a LAN Emulation Server (LES), a Broadcast and Unknown Server (BUS) and LAN Emulation Configuration Server (LECS). The LES, BUS and LECS constitute what is known as the LANE Service.

The LAN Emulation Clients (LECs) represent a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC may first communicate with an LECS. It may utilize a specific ATM address of the LECS if it knows it, or, as it typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE BUS is responsible for the distribution of the Broadcast, Multicast and unknown traffic to the LECs which is typically sent by a LEC before the ATM address has been resolved. Note that a given BUS serves only one emulated LAN.

The LECS contains the database used in determining which emulated LAN a LEC belongs to. Each LEC consults the LECS once, at the time it requests to join an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LEC ATM address, the ELAN name, the LEC MAC address or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS prevents LECs from joining ELANs in the future, while failure of the LES takes the entire emulated LAN down.

In these types of implementations, what happens is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECSs, LESs and BUSs.

In connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

In the draft Version 2.0 of the LANE standard, the services include having multiple LESs with each LES having multiple ELANs. The LECs (clients) are apportioned across the LESs. Redundancy is handled by defining several LESs for the same ELAN, i.e., LES #1, LES #2, etc. The prior art redundancy method is described in connection with FIG. 2 which illustrates a portion of an example prior art Emulated LAN having a plurality of LECSs, LECs and LESs. The Emulated LAN, generally referenced 10, comprises an ATM network cloud 19 which includes a plurality of nodes (switches) 12 connected by one or more links. The network comprises a plurality of LECSs 14 labeled LECS #1 and LECS #2, LESs labeled LES #1 and LES #2 and LECs 16 labeled LEC #1 through LEC #6.

Figure 2:
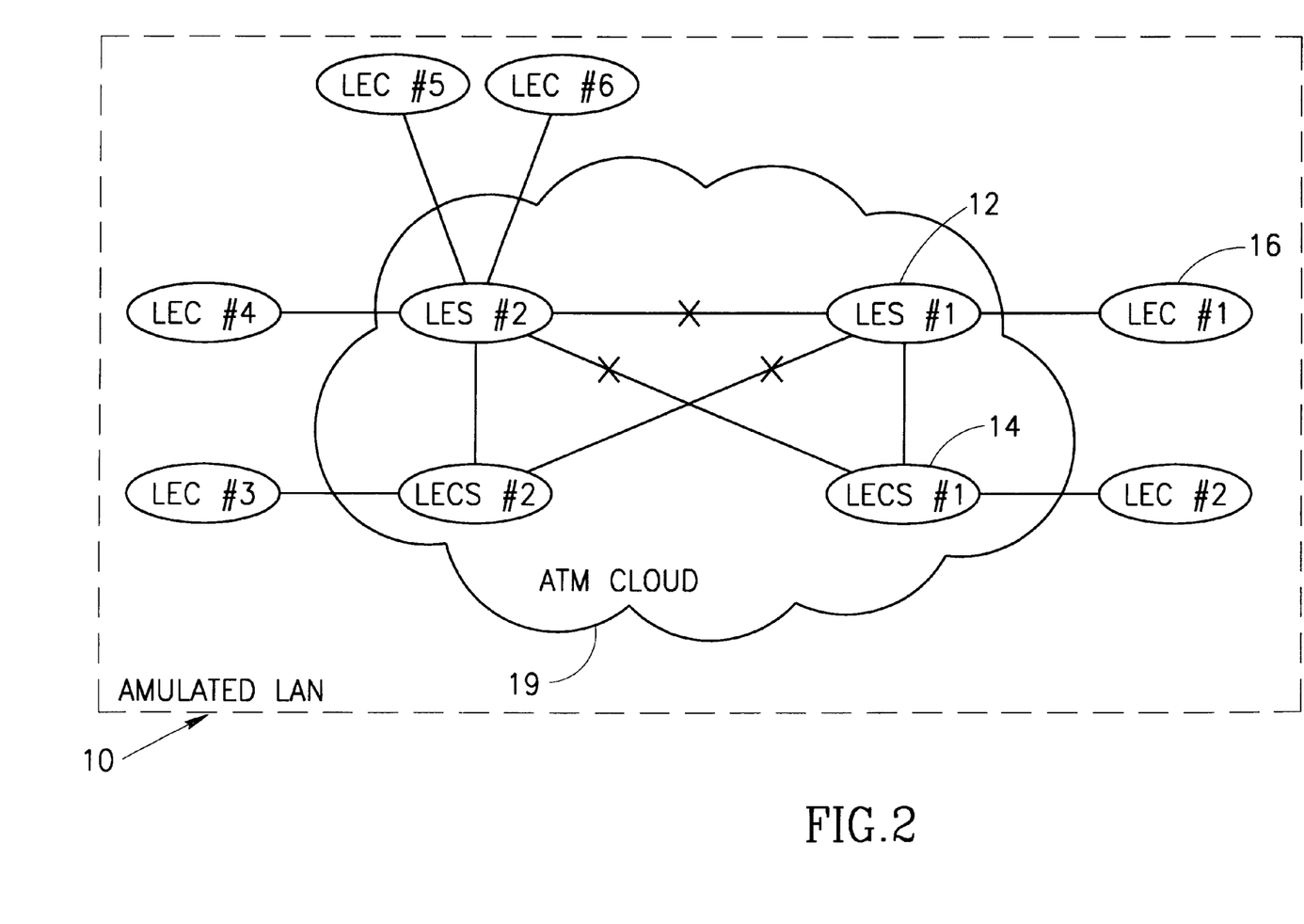
FIG. 2 is a diagram illustrating the example Emulated LAN of FIG. 1 having a physical split in the network.

Via messages communicated among the LECSs in the ELAN using the LNNI protocol, the LECSs know at all times the status of the LECSs in the ELAN, i.e., whether each LECS is currently up or down. In addition, each LECS maintains a list of currently active LESs. This provides redundancy for the ELAN in that when a LEC discovers that its LES failed, it goes to the LECS the assigns the LEC to another LES. The LES can assign the LEC to another LES since it has knowledge of which LESs are up or down.

The LNNI proposed model includes protocols between LESs, protocols between LECSs and protocols between LECSs and LESs. These protocols are necessary for (1) synchronization purposes, to insure that all the entities of the same type use the same database and for (2) distribution of LAN Emulation control frames between various entities. Note that the LNNI specification is currently scheduled to be standardized by the end of 1998.

In the distributed model of the LES service, there may be serveral active LESs per ELAN. An active LES is defined as a LES for which there is at least one LEC connected to it. As long as the subnetwork does not physically split into several subnetworks, the existence of more than one active LES is not valid in the non distributed implementation of the LES. The situation wherein more than one active LES is associated with an ELAN in a single subnetwork is called a split ELAN.

A physical split is not desirable, thus a logical split, i.e., a VLAN, is used to make the best of the physical split. When the physical split is repaired, it is desirable to remove the logical split as well. The repair of the physical split is detected while the VLANs that are split are known as well. The VLANs are united by synchronizing the databases within the LECSs and resetting the LECs on the effected side of the VLAN.

In a non distributed implementation type ELAN, a split occurs when two LECs that would otherwise be in the same ELAN, join different LESs. The result is that they belong to different ELANs. This situation is called a split Virtual LAN (VLAN). This situation occurs when the two LECs receive different responses to configuration requests for the same ELAN from an LECS, i.e., different LES addresses. This may occur in one of two cases: (1) the LECs send configuration requests to different LECSs wherein the LECSs are not synchronized with one another or (2) the LECs send configuration requests to the same LECS at different times wherein in the interim, the LECS database changed.

SUMMARY OF THE INVENTION

The present invention is a method of creating and resolving split VLANs in ATM networks. The method utilizes a Network Management System (NMS) and a standard management protocol such as SNMP. The method monitors the network by continuously polling all the devices in the network. Status related information collected by the NMS is used to construct a physical and logical topology of the network. In response to a detected physical split in the network, the NMS creates a logical split in the network by splitting one or more VLANs. The split VLAN can be created if a redundant (secondary) LES and a second LECS are located on the side of the split which does not include the primary LES and LECS. The second LECS is configured to use the address of the redundant LES in replying to requests to participate in an ELAN from the disconnected LECs.

The repair of the physical split is also detected by the NMS. In response, the NMS modifies the databases of all the LECSs in the administrative network domain so that the same primary LES address is returned to any LEC requesting to join an ELAN. LECs previously attached to the redundant LES are disconnected and forced to re-initialize with the LECS. All the LECSs reply to a re-initialization request by a LEC with the same address of the primary LES.

It is important to note that the method of the present invention is applicable regardless of the number of physical splits that occur in the network. Throughout this document, an example whereby a network is split into two portions is given for illustrative purposes only. The invention is capable of handling the occurrence of any number of physical splits, any number of generated separate VLANs and any number of LECSs and LESs in the network.

There is provided in accordance with the present invention, in a network consisting of a plurality of network devices and an Emulated Local Area Network (ELAN), the ELAN having of one or more LAN Emulation Configuration Servers (LECSs), one or more LAN Emulation Servers (LESs) and one or more LAN Emulation Clients (LECs), a method of creating and resolving split Virtual LANs (VLANs), the method comprising the steps of monitoring the plurality of network devices on a continuous basis, constructing a physical and logical topology of the network from information collected, detecting the occurrence of a physical split in the network and in response, creating split VLANs by configuring a second LECS to reply to LEC requests with the address of a secondary LES wherein the secondary LECS, LEC and the secondary LES are on the same network portion and detecting the repair of the physical split in the network and in response, uniting the split VLANs.

The step of monitoring comprises the step of collecting status related information by polling via a Network Management System (NMS) and standard Management Information Base (MIBs) located in the plurality of network devices. The step of collecting status related information utilizes out of band Ethernet based communications between the NMS and the plurality of MIBs. The step of collecting status related information utilizes in band LAN Emulation based communications between the NMS and the plurality of MIBs.

The step of uniting the split VLANs comprises the steps of synchronizing the databases within all LECS in the ELAN to reply to LEC requests with the address of a primary LES, terminating connections between the secondary LES and LECs connected thereto and connecting the disconnected LECs to the primary LES, via the establishment of connections therebetween, so as to unite the split VLANs.

There is also provided in accordance with the present invention, in a network consisting of a plurality of network devices and an Emulated Local Area Network (ELAN), the ELAN having of one or more LAN Emulation Configuration Servers (LECSs), one or more LAN Emulation Servers (LESs) and one or more LAN Emulation Clients (LECs), a method of resolving split Virtual LANs (VLANs), the method comprising the steps of synchronizing the databases within all LECS in the ELAN to reply to LEC requests with the address of a primary LES, terminating connections between the secondary LES and LECs connected thereto and connecting the disconnected LECs to the primary LES, via the establishment of connections therebetween, so as to unite the split VLANs.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| BUS | Broadcast and Unknown Server |
| CCITT | Comite Consulatif International Telegraphique et Telephonique |
| ELAN | Emulated Local Area Network |
| FDDI | Fiber Distributed Data Interface |
| IISP | Interim Inter-Switch Signaling Protocol |
| IP | Internet Protocol |
| ITU | International Telecommunications Union |
| ITU-T | International Telecommunications Union-Telecommunications Standards Sector |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| MIB | Management Information Base |
| NMS | Network Management System |
| PNNI | Private Network to Network Interface |
| PVC | Permanent Virtual Circuit |
| SNMP | Simple Network Management Protocol |
| SVC | Switched Virtual Circuit |
| TCP | Transmission Control Protocol |
| UDP | User Datagram Protocol |
| UNI | User to Network Interface |
| VCC | Virtual Channel Connection |
| VLAN | Virtual Local Area Network |

General Description

The present invention is a method of creating split VLANs and subsequently resolving them after the physical split is removed. A diagram illustrating an example ATM network having an Emulated LAN having a plurality of nodes, LESs, LECSs and LECs is shown in FIG. 1. The ATM network having an Emulated LAN (ELAN), generally referenced 10, comprises a plurality of nodes with some of the nodes implementing one or more network services, i.e., LANE services. In this example the ELAN is shown comprising a plurality of LESs 12 labeled LES #1 and LES #2, a plurality of LECS 14 labeled LECS #1 and LECS #2 and a plurality of LECs 16 labeled LEC #1 through LEC #6.

In order for an ELAN to operate correctly, it is crucial that the LES within the ELAN remain up and running continuously. If for some reason the LES fails to operate, the result could be the lost of LAN connectivity. When LAN connectivity is lost, the time it takes to recover is very critical. One way to recover from such a failure is to use a redundancy mechanism built into the ELAN. The failed LES is replaced with a working backup LES. The original LES that failed is called the primary LES and the backup LES is called the secondary LES. The action of replacing the primary LES with the secondary LES is called a switchover operation. Note although there can be more than one backup LES, a single backup LES is used here for illustrative purposes only.

A diagram illustrating the example Emulated LAN of FIG. 1 having a physical split in the network is shown in FIG. 2. The example ELAN 10 is shown with three of the links failed. The failed links are between LECS #1 and LES #2, LES #2 and LES #1 and between LECS #2 and LES #1. The failure of these three links causes a physical split in the network resulting in two unconnected ELAN portions.

When a network is physically split, some of the LECs will be on the side of the split which does not include the primary LES. When this occurs, the LECs on the opposite side of the split as the primary LES will not be able to connect to the primary LES. If, however, there exists a secondary LES and second LECS on the same side as the stranded LECs, then those LECs can join the secondary LES. This results in two separate VLANs that operate independently of each other.

A mechanism in the NMS and in the LECS can be used to handle the physical split of the network. The NMS alters the database of the LECS after a physical split. Consequently, the LECs that use the updated LECS will join the backup LES rather than the primary LES. The LECs on the other side of the physical split will continue to use the unaltered LECS and will join the primary LES. This results in a split VLAN. In other words, a physical split may result in a logical split.

With reference to FIG. 2, assume that LES #1 is the primary LES and LES #2 is the secondary LES. The LECs on the left side of the split cannot connect to LES #1 due to the physical split. LEC #1 and LEC #2 continue to use LES #1 without being aware that a physical split in the network has occurred. LECs #3 through #6, however, can join the secondary LES, i.e. LES #2. This results in separate left and right side VLANs.

In operation, LECs #3 through #6 receive a termination indication due to the fact that the LES cannot be reached. The LES cannot be reached due to the physical split. The NMS recognizes the split and, in response, updates the database in LECS #2 to point to LES #2. LECs #3 through #6 re-establish the configuration phase to the LECS #2. LECS #2 replies to the requests with the address of LES #2.

In order to create a split VLAN, the NMS application must first detect that a physical split has occurred. This is achieved by continuously monitoring the network and detecting when a physical split has occurred. A monitor application executes on the Network Management System (NMS). The monitor application continuously checks the network and determines its connectivity. When it detects a physical split in the network, it alters the appropriate LECS's database so as to create a split VLAN.

Figure 3:
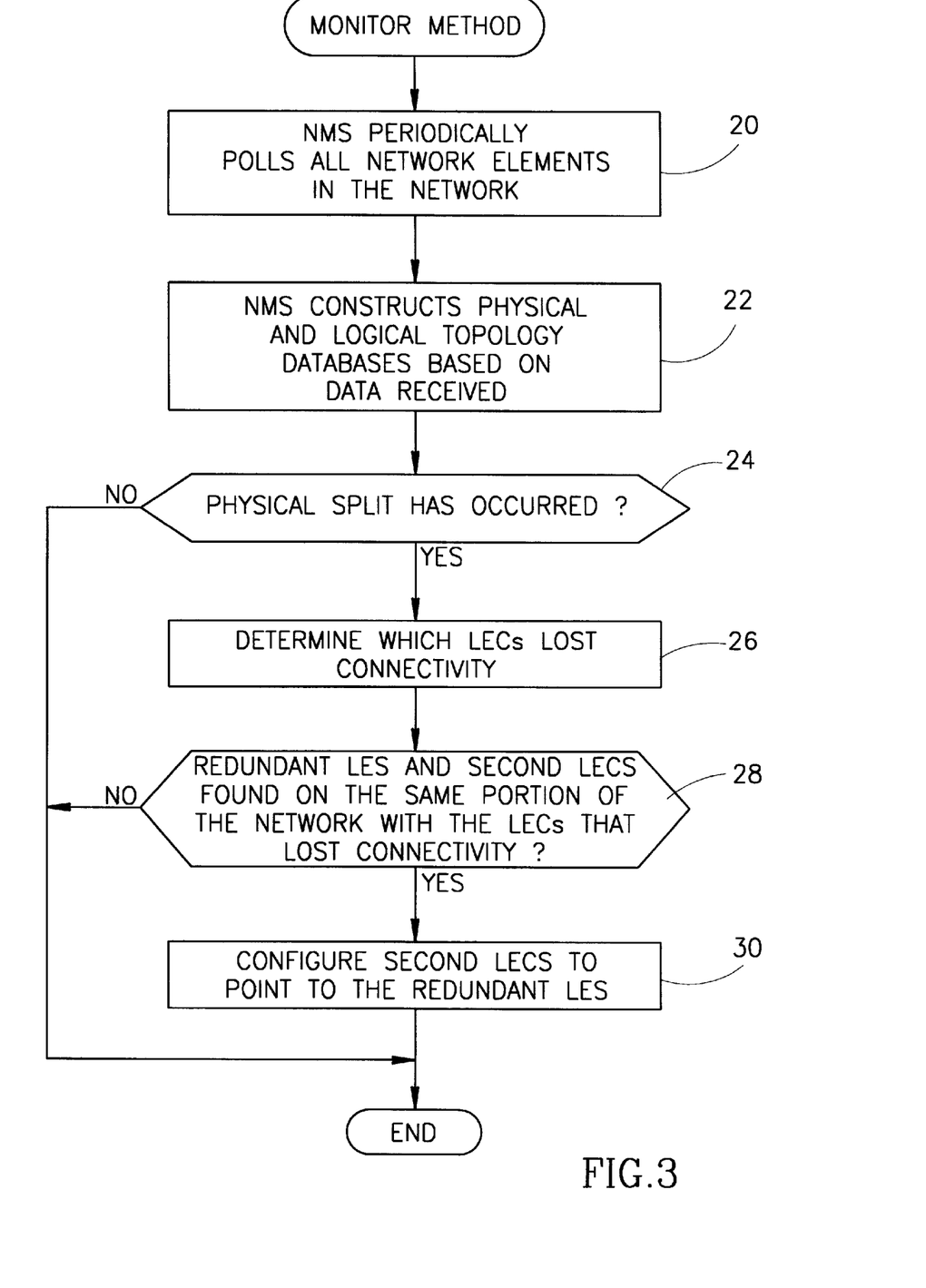
FIG. 3 is a flow diagram illustrating the monitoring portion of the method of the present invention.

A flow diagram illustrating the monitoring portion of the method of the present invention is shown in FIG. 3. On a continuous basis, the NMS polls all the network elements in the network (step 20). The NMS can use any suitable means such as Ethernet (out of band) or LANE (in band). Each logical and physical network element is polled, i.e., keep alive signals, status information including information about its neighbors, etc. In this fashion, the NMS learns which nodes, elements and links are operating correctly and which nodes, elements and links have failed.

In monitoring the network, the NMS utilizes the MIBs maintained in the network devices. A large number of the network devices used to construct networks incorporate some form of network management. In the majority of cases the network management protocol used is the Simple Network Management Protocol (SNMP). The configuration, status and statistical information in a device can be thought of as forming a virtual database. In reality, information in the device can be stored as a combination of switch settings, hardware counters, memory variables, files, etc. This logical database of network management information is known as a Management Information Base (MIB). The NMS obtains status about a device and configures settings and functions within the device via the MIB. The NMS communicates with the MIBs in the managed network device via the SNMP protocol. The User Datagram Protocol (UDP) is the preferred and recommended transport protocol for SNMP. A more detailed description of the SNMP protocol can be found in SNMP—A Guide To Network Management, Sidnie Feit, McGraw-Hill, Inc., 1995.

The various data elements making up a MIB may include status information about the system or device, any interfaces in the device, neighboring device IDs, etc. For example the MIB in a managed device such as a router may include system ID, number of interfaces, a routing table, traffic counts, error counts, etc. A large number of standard MIBs are currently defined for all types of network entities including switches, routers, bridges, multiplexors, LANE, TCP, IP, UDP, ATM, etc.

In collecting status information from the network the MIB-II elanMIB and atmMIB standard MIBs may be used. The MIB-II includes the ifTable which contains the status of all physical and logical elements including the status of all physical ports, the LECs, LECSs, LESs, VLANs, etc.

The elanMIB includes elanConfTable, elanLesTable and lecsConfTable. The elanConfTable provides a list of all the names of the ELANs in the network. The elanLesTable comprises a list of all the ATM addresses for each ELAN that is specified in elanConfTable. Note that each entry in the elanConfTable can have more than one ATM address associated with the ELAN. The lecsConfTable comprises a list of all available LECSs.

The atmMIB includes atmInterfaceMyNeighborIpAddress which is the IP address of the neighboring system connected to the far end of an ATM interface of the switch to which a NMS can send SNMP messages.

Based on the network information gathered from continuously polling the MIBs in various network devices, the NMS constructs both a physical and a logical topology of the network (step 22). The NMS learns the physical and logical topologies including the relationships between them. The logical topology is learned from information collected from the switches in the network. Each switch returns information about the links connected to it, any network services running on the switch, e.g., LES, LECS, etc. The NMS also learns when a switch is unreachable. This can be due to a failure of either the link or the switch. If out of band management is used, the NMS can know which occurred since the NMS is in contact with the switch. If in band management is used, the NMS may not be able to ascertain whether the link or the switch failed. Thus, the NMS learns about the occurrence of a physical split in the network with the result being two physically separate networks (step 24). In addition, the NMS has knowledge of which LECSs, LESs and LECs lost connectivity and which are on either physical side of the network (step 26).

From this knowledge, the NMS concludes which LECs lost connectivity to their associated ELAN. The NMS then searches for a redundant LES and second LECS that reside on the same portion of the network as each other, i.e., the same side of the split, as the stranded LECs. If a redundant LES and second LECS are found on the same portion of the network with the LECs that lost connectivity (step 28), the NMS alters the database within the LECS to use the redundant LES in replying to requests to join an ELAN (step 30). When the LEC sends a request to the second LECS, the response directs the LEC to the secondary (i.e. redundant) LES. In this fashion, the split VLAN is created. Note that in most cases, it is preferable to have a split VLAN than no VLAN at all.

Figure 4:
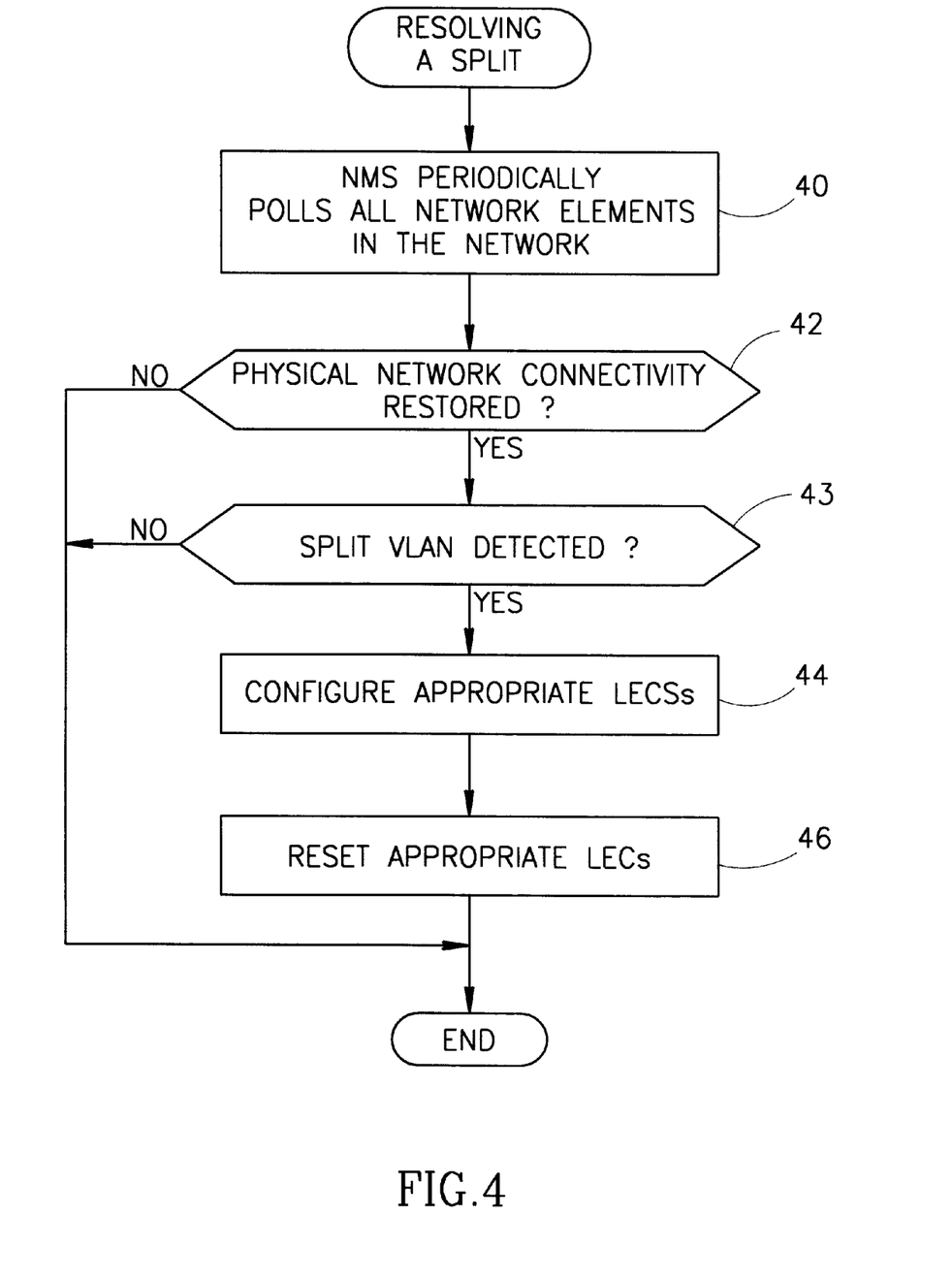
FIG. 4 is a flow diagram illustrating the split resolution portion of the method of the present invention.

A flow diagram illustrating the split resolution portion of the method of the present invention is shown in FIG. 4. Since a split in the network, either physical or logical, is not desirable, split VLANs should be united back together once network connectivity is restored. This is regardless of the fact that the split VLAN was deliberately created using the above described method. The restoration of network connectivity, like the failure of a link, is learned by the NMS via polling. On a continuous basis, the NMS polls all the network elements in the network (step 40). The NMS can use any suitable means such as Ethernet (out of band) or LANE (in band). Each logical and physical network element is polled, i.e., keep alive signals, status information including information about its neighbors, etc. In this fashion, the NMS learns which nodes, elements and links are operating correctly and which nodes, elements and links have failed. In monitoring the network, the NMS utilizes the MIBs maintained in the network devices as described previously. Thus, the NMS becomes aware when the physical network connectivity is restored (step 42). The same monitoring entity in the NMS that polls the network to ascertain the connectivity, also determines when the physical split is repaired.

Data previously stored in the NMS or data gathered from the LECs can alternatively be used by the NMS in determining the status of the one or more VLANs in the network. This information can be used by the NMS to determine the different one or more VLANs in the network. If there are LECs attached to two separate ELANs which are on either side of the split, it may mean that a physical split has occurred (step 43).

When it determines that the physical split is fixed and that one or more split VLANs exist, it modifies the database in the appropriate LECSs (step 44). Once the databases in the LECSs are synchronized, the appropriate LECs are reset in order to initiate a re-unification of the split VLAN(s) (step 46). A method of synchronizing the databases among all the LECSs in the network suitable for use with the present invention is described in U.S. application Ser. No. 09/085, 918, entitled A NON DISTRIBUTED LAN EMULATION SERVER REDUNDANCY METHOD, filed May 28, 1998, similarly assigned and incorporated herein by reference.

As described above, from the topology information collected by the NMS, it is concluded that the LECs that were previously unable to connect to their primary LES are now able to previously connected. These LECs, however, connect to their secondary LES thus creating a second ELAN. Once the physical split is removed, the VLANs are preferably united. This is achieved in accordance with the following.

First, the NMS, via SNMP and the MIBs in the device or by via any other suitable management means, synchronizes the databases in each of the LECSs so that no matter which LECS a LEC contacts with a request, the results are the same, i.e., the LEC is referred to the same LES. Second, the NMS terminates all the connections between the LECs and the secondary LES. This is achieved using MIBs in the devices making up the ELAN. The disconnected LECs consequently revert to the initial state causing them to request an address of an LES from the LECS. The LECSs will reply with the address of the primary LES. The VLAN is united once all the disconnected LECs join the primary LES.

Note that the method of the present invention operates in both LANE Version 1.0 and Version 2.0 environments. In fact, LANE Version 1.0 does not address the issue of split VLANs. Thus, in LANE Version 1.0 ELANs, recovery from splits must be manually performed by the network administrator. A high skill level and intimate knowledge of the network topology are required to manually perform this task.

In addition, the management connection method can be implemented either over LANE (in band) or via Ethernet (out of band). Further, the method utilizes standard SNMP and MIB based network management protocols in contrast to prior art proprietary management schemes.

While the invention has been described with respect to a limited number of embodiments, it will be appreciated that many variations, modifications and other applications of the invention may be made.

What is claimed is:

1. A method of creating and subsequently re-uniting a split Virtual Local Area Network (VLAN) in the event of a physical break in an Emulated Local Area Network (ELAN) consisting of a plurality of network devices, said ELAN including a primary LAN Emulation Configuration Server (LEC), a primary LAN Emulation Server (LES) and one or more LAN Emulation Clients (LECs), said method comprising the steps of:

detecting the occurrence of a physical split in said ELAN;

configuring a second LECS to reply to LEC initialization requests with the address of a secondary LES, thus creating a split VLAN, wherein said secondary LECS and said primary LES operate on one side of said split and said secondary LES and secondary LES operate on an opposite side of said split;

detecting the repair of said physical split in said ELAN;

configuring said secondary LECS to reply to LEC initialization requests with the address of said primary secondary LES;

terminating connections between said secondary LES and any LECs connected thereto; and resetting all LECs whose connections to said secondary LES were terminated so as to cause the establishment of connections between said primary LES and LECs whose connections to said secondary LES were terminated, thus re-uniting said split VLAN.

2. The method according to claim 1, wherein said step of detecting the occurrence of and said step of detecting the repair of a physical split comprise the step of collecting status related information by polling using a Network Management System (NMS) and one or more standard Management Information Base (MIBs) configured in said plurality of network devices.

3. The method according to claim 2, wherein said step of collecting status related information utilizes out of band Ethernet based communications between said NMS and said one or more standard MIBs.

4. The method according to claim 2, wherein said step of collecting status related information utilizes in band LAN Emulation based communications between said NMS and said one or more standard MIBs.

5. A method of creating and subsequently re-uniting a plurality of split Virtual Local Area Networks (VLANs) in the event of a plurality of physical breaks in an Emulated Local Area Network (ELAN) consisting of a plurality of network devices, said ELAN including a primary LAN Emulation Configuration Server (LEC), a primary LAN Emulation Server (LES) and one or more LAN Emulation Clients (LECs), said method comprising the steps of:

detecting the occurrence of a plurality of physical splits in said ELAN, said plurality of physical splits partitioning said ELAN into a primary portion and a plurality of secondary portions;

configuring a secondary LECS in each secondary portion of said ELAN to reply to LEC initialization requests with the address of a secondary LES in each secondary portion of said ELAN, thus creating a plurality of split VLANs wherein said primary LECS and said primary LES operate in said primary portion of said ELAN and the secondary LECSs and the secondary LESs operate in said plurality of secondary portions of said ELAN;

detecting the repair of said plurality of physical splits in said ELAN;

configuring the secondary LECSs to reply to LEC initialization requests with the address of said primary LES;

terminating connections between the secondary LESs and any LECs connected thereto; and resetting all LECs whose connections to the secondary LESs were terminated so as to cause the establishment of connections between said primary LES and LECs whose connections to the secondary LESs were terminated, thus removing said plurality of split VLANs and re-uniting said ELAN.

6. A Network Management System (NMS) for creating and subsequently re-uniting a split Virtual Local Area Network (VLAN) in the event of a physical break in an Emulated Local Area Network (ELAN) consisting of a plurality of network devices, said ELAN including a primary LAN Emulation Configuration Server (LEC), a primary LAN Emulation Server (LES) and one or more LAN Emulation Clients (LECs), comprising:

first detecting means for detecting the occurrence of a physical split in said ELAN;

first configuration means for configuring a secondary LECS to reply to LEC initialization requests with the address of a secondary LES, thus creating a split VLAN, wherein said primary LECS and said primary LES operate on one side of said split and said secondary LECS and secondary LES operate on an opposite side of said split;

second detecting means for detecting the repair of said physical split in said ELAN;

second configuration means for configuring said secondary LECS to reply to LEC initialization requests with the address of said primary LES;

means for terminating connections between said secondary LES and any LECs connected thereto; and means for resetting all LECs whose connections to said secondary LES were terminated so as to cause the establishment of connections between said primary LES and LECs whose connections to said secondary LES were terminated, thus re-uniting said split VLAN.

7. The system according to claim 6, wherein said first detecting means and said second detecting means comprise means for collecting status related information by polling using one or more standard Management Information Base (MIBs) configured in said plurality of network devices.

8. The system according to claim 7, wherein said means for collecting status related information utilizes out of band Ethernet based communications between said NMS and said one or more standard MIBs.

9. The system according to claim 7, wherein said means for collecting status related information utilizes in band LAN Emulation based communications between said NMS and said one or more standard MIBs.

10. The system according to claim 7, wherein said first configuration means comprises means for synchronizing a database located in said secondary LECS to reply to LEC initialization requests with the address of said secondary LES.

11. The system according to claim 7, wherein said second configuration means comprises means for synchronizing a database located in said secondary LECS to reply to LEC initialization requests with the address of said primary LES.

\* \* \* \* \*